April 6, 1965  P. DORNIER ETAL  3,176,413
FLYABLE HELICOPTER PILOT TRAINING APPARATUS
Filed March 20, 1963  2 Sheets-Sheet 1
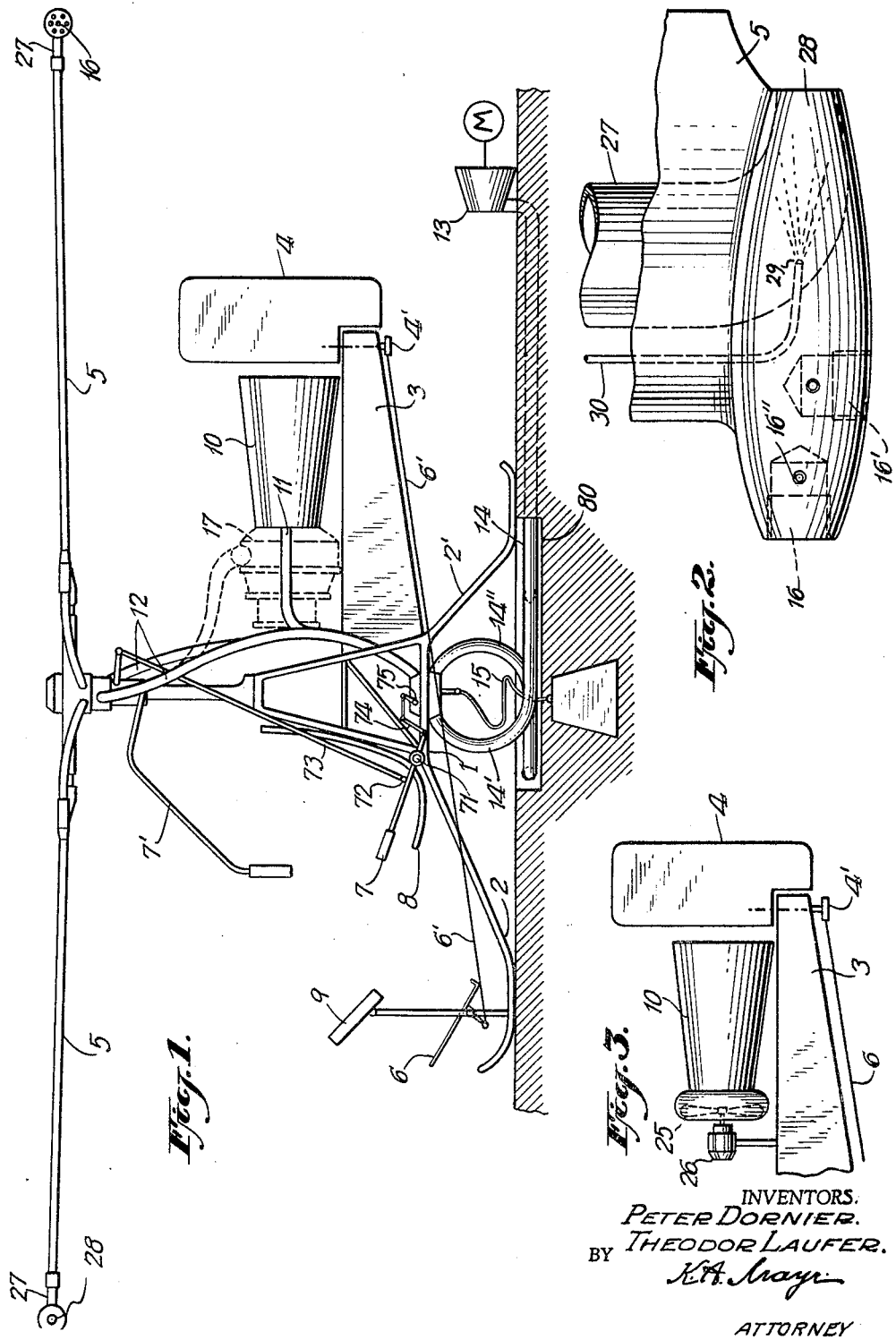
INVENTORS.
PETER DORNIER.
THEODOR LAUFER.
BY K.H. Mayr
ATTORNEY April 6, 1965 P. DORNIER ETAL 3,176,413
FLYABLE HELICOPTER PILOT TRAINING APPARATUS
Filed March 20, 1963 2 Sheets-Sheet 2
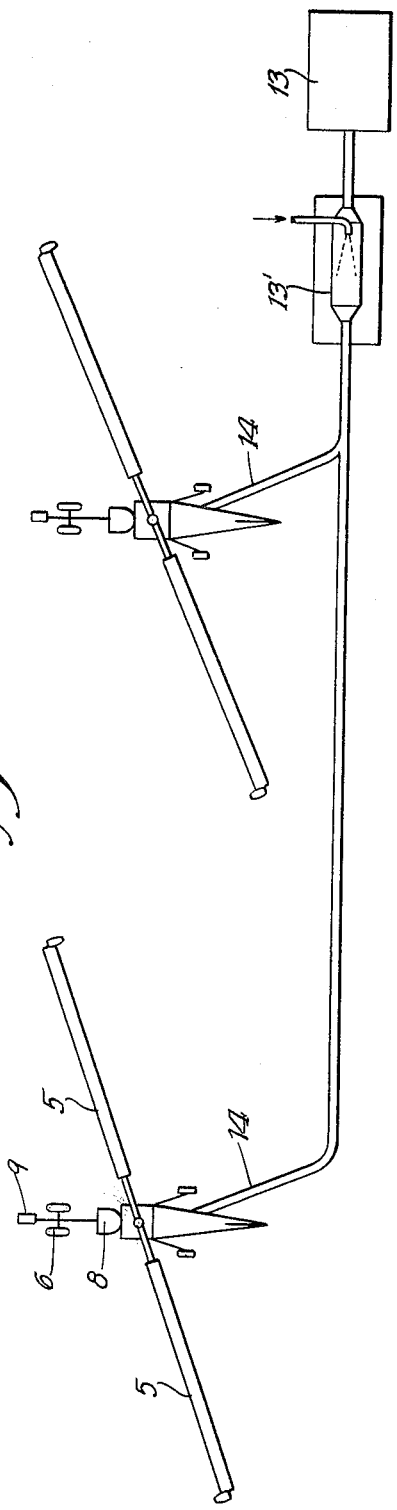
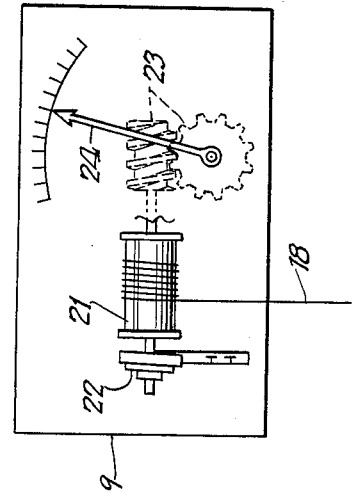
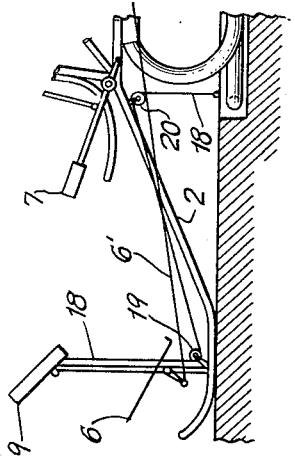
INVENTORS.
PETER DORNIER.
THEODOR LAUFER.
BY K.A.Mayr
ATTORNEY.

3,176,413
FLYABLE HELICOPTER PILOT TRAINING APPARATUS
Peter Dornier, Lindau, and Theodor Laufer, Friedrichshafen, Germany, assignors to Dornier-Werke G.m.b.H., Friedrichshafen, Germany, a firm of Germany
Filed Mar. 20, 1963, Ser. No. 266,735
6 Claims. (Cl. 35—12)

The present invention relates to an apparatus for training helicopter pilots which apparatus is capable of flying.

Piloting helicopters is difficult because, in contradistinction to aircraft having rigid wings, helicopters are dynamically unstable if the forward speed is below a certain minimal speed. Therefore, training a helicopter pilot takes considerably more time than training a rigid wing aircraft pilot. Training helicopter pilots is also expensive because the conventional helicopter is a complicated apparatus.

A number of apparatus have been proposed for training helicopter pilots without endangering the unexperienced trainees. These apparatus rest on the ground and simulate flying conditions. Many conventional apparatus include complicated electronic devices which do not only actuate indicating devices but also produce a picture of the flying field on a screen, position and size of the picture as well as the picture itself being variable in response to the action of the pilot. Training apparatus of this kind do not give a feeling of actual flight.

A training apparatus has been proposed which includes a motor-driven rotor and is capable of rotating and moving up and down. Another conventional training apparatus rests on a spherical float and can make movements around the longitudinal axis and the transverse axis and can also move horizontally on the water surface. Means may be provided for limiting the extent of the individual movements, such as elastic abutments, brakes, and the like. The helicopter mock-up may be connected to the float by a telescope structure permitting limited vertical movements and damping shocks when descending. This structure also affords rotation of the mock-up without rotating the float.

Training devices having a mechanically driven rotor require complicated torque compensation apparatus including a sensitive tail rotor which is subjected to high continuous load and requires a great part of the attention of the trainee. The conventional devices do not truly simulate the dynamic instability of the actual helicopter.

It is an object of the invention to provide a training apparatus for training helicopter pilots which avoids the shortcomings of conventional training apparatus.

An object of the invention resides in the provision of a training apparatus for helicopter pilots which is relatively simple and inexpensive and gives the trainee the feeling of actual flying.

An object of the invention resides in the provision of a training apparatus for helicopter pilots which provides the dynamic instability inherent in a helicopter flying at low forward speed.

The apparatus according to the invention includes a driven rotating wing system and a pilot's seat provided with the operating and steering devices necessary for flying a helicopter. The apparatus comprises a flyable device which can be lifted from the ground by a jet reaction rotor which receives its operating medium from supply means resting on the ground, the device being tied to the ground, for example, by means of a rope connected to the device at its center of gravity.

The apparatus according to the invention permits free flying of the training device and provides the trainee with a feeling of actual flying until the mooring line becomes effective. The jet reaction motor drive makes it unnecessary to provide torque compensation which is necessary with conventional training devices and which presents complicated problems to the trainee already at the beginning of his training. The absence of apparatus for supplying driving gas in the flyable device does not only save weight and makes the structure simple, but also avoids elements subject to wear which require continuous supervision and service. Placing the plant for supplying driving gas on the ground reduces first cost and operating expense and affords simultaneous supply of driving gas to a plurality of training devices.

Since the training device according to the invention is capable to fly, the trainee, after completion of basic ground training, can continue training and fly with the device which he became accustomed to. An apparatus for supplying driving gas may be placed on the device so that the trainee can continue his education and fly freely, without being tied to the ground and without changing flying apparatus.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a diagrammatic elevation of a training apparatus according to the invention.

FIG. 2 is a large scale diagrammatic illustration of the end portion of a rotor blade forming part of the apparatus shown in FIG. 1.

FIG. 3 is a diagrammatic illustration of a modification of a lateral steering apparatus.

FIG. 4a is a diagrammatic elevation of an apparatus for indicating the height above the ground of the apparatus shown in FIG. 1.

FIG. 4b is a more detailed illustration on a larger scale of the height-indicating apparatus shown in FIG. 4a.

FIG. 5 is a diagrammatic plan view of a system for training helicopter pilots, including a plurality of flyable training devices.

The training apparatus shown in FIG. 1 is substantially a normal, one-man helicopter wherein the power unit is omitted. The fuselage 1 is provided with a three-leg landing frame 2, 2'. A rudder 4 is supported by a tail unit carrier 3. Numeral 5 designates rotor blades whose outer ends are provided with gas outlet nozzles for producing a jet reaction drive, which is shown on larger scale in FIG. 2. A conduit 27 placed in the rotor blade 5 terminates in a reaction nozzle 28.

Numeral 6 designates rudder pedals for actuating a tackle including a rope 6' and a roller 4' for moving the rudder 4.

Numeral 7 designates a lever swingable on a fulcrum 71. A link 73 is pivotally connected to the lever 7 at 72. The upper end of the link 73 is connected to actuating means in the rotor hub for simultaneously and equally adjusting the pitch of the rotor blades. The lever 7 is provided in the conventional manner with a rotatable handle for actuating a linkage 74 which controls a throttle 75 controlling the supply of operating medium to the jet reaction rotor.

A lever 7' is connected in the conventional manner to the rotor hub and serves for controlling the opposite cyclic change of the angle of incidence of the rotor blades.

Numeral 8 designates a seat for the pilot, an instrument board 9 being placed in front of the seat. If desired, a second seat may be mounted, for example, onto the rear of the fuselage.

The medium, for example compressed air, for effecting the reaction drive is supplied by a plant 13 resting on the ground, for example a compressor, and conducted to the training apparatus through a pipe or hose 14 which is placed in a recess 80 in the ground and whose end is forked for forming two loop portions 14', 14" from which the compressed air is conducted through flexible hoses 12 into the air ducts 27 in the rotor blades 5. This arrangement permits turning of the training device through at least 360°. Other means affording turning of the training device without damaging the hose connection, for example rotatable articulations, may be proivded without departing from the scope of the invention.

The operating medium may be preheated, for example, by supplying fuel through a pipe 30 and injecting and burning the fuel at 29 in FIG. 2 in the nozzle 28.

In order to influence the instability of the helicopter the moment of inertia of the rotor blades may be changed by mounting masses 16 and 16' in the tip of the blades and holding them therein by set screws 16", as shown in FIG. 2.

Rotation of the rotor causes lifting of the device from the ground to a height which is limited by a rope 15, cable, articulated linkage, or the like, having one end connected to the apparatus at the center of gravity thereof and the second end anchored in the ground. The apparatus can fly freely as long as the rope is not taut. The length of the rope depends on the structure of the landing frame or tripod and should permit a flight height of at least two feet.

In order to show the flight height to the trainee a device is provided as shown in FIGURES 4a and 4b. A line 18 extends from the instrument board 9 past rollers 19 and 20 to the ground whereto it is made fast. A spool 21 for winding the line 18 is provided at the instrument board. A spiral spring 22 tends to rotate the spool for winding the line 18 thereonto and holding it taut. A worm 23 connected to the spool 21 coaxially thereof engages a worm wheel whose angular position is indicated by an indicator 24.

For lateral steering an air jet is directed onto the rudder 4 by means of a diffusor 10 and a nozzle 11; compressed air is used for this purpose which is supplied by the unit 13. The diffusor produces a thrust which simulates the thrust produced by the exhaust of a turbine driving the compressor for producing compressed air for driving the reaction rotor of a helicopter. In a modification of the training device a small electric motor 26 is mounted on the carrier 3 for driving a fan 25 blowing air into the diffusor 10 (FIG. 3).

The training device according to the invention makes the trainee acquainted with all movements and positions occurring during actual flight, when hovering and slowly moving forward, and with the control of said movements. The trainee does not need to compensate torque and is not distracted thereby. He can concentrate on dealing with the dynamic instability of the helicopter when hovering. The trainee may confer with the trainer by microphone.

FIG. 5 shows an arrangement wherein a plurality of training devices shown in plan view are served from a single compressor plant 13. The compressed air is preheated by conducting it through a combustion chamber 13' and burning fuel therein. In a modification, not shown, the compressed air is preheated by heat exchange with a hot medium.

When the trainee is sufficiently advanced an independent power unit 17 may be mounted on the training device as indicated by dotted lines in FIG. 1 and a fuel tank provided in the fuselage so that the trainee can practice free flying with the same apparatus on which he received his basic training and to which he is already used.

We claim:

1. A flyable training apparatus for supporting and training helicopter pilots, comprising:
   a device capable of leaving the ground and including:
   a pilot's seat,
   a compressed air jet driven helicopter reaction rotor capable to lift said device from the ground and to maintain said device in the air,
   conduit means connected to said rotor for supplying compresesd air thereto,
   a rudder,
   a diffuser connected to said conduit means for receiving compressed air therefrom and discharging air expanded in said diffusor onto said rudder and producing a thrust simulating the thrust produced by a turbine driving the compressor producing compressed air for driving the reaction rotor of a helicopter,
   means operable by the trainee for controlling the pitch of the blades of said rotor, for controlling said rudder, and for controlling the supply of compressed air to said conduit means;
   compressed air supply means resting on the ground,
   a pipe connecting said compressed air supply means to said conduit means, and
   tether means for anchoring said device to the ground for limiting movement of said device away from the ground.

2. A flyable training apparatus as defined in claim 1 wherein said pipe has a flexible and forked end portion forming two loops and connected to said conduit means for permitting rotation of said device.

3. A flyable training apparatus as defined in claim 1 including a power unit and fuel storing means readily mountable on said device for supplying driving medium to said rotor and converting said device into an untethered helicopter flying on its own power.

4. A flyable training apparatus as defined in claim 1 wherein said means resting on the ground includes means for preheating the compressed air.

5. A flyable training apparatus as defined in claim 1 including masses removably mounted at predetermined locations on the blades of said rotor for changing the moments of inertia of the rotor blades for simulating the behavior of different reaction rotors.

6. A flyable training apparatus for training helicopter pilots, comprising:
   a device capable of leaving the ground and including:
   a pilot's seat, and
   a jet driven reaction rotor capable to lift said device from the ground and maintain said device in the air;
   means resting on the ground for supplying driving medium for said rotor,
   conduit means interconnecting said last-mentioned means and said rotor for conducting driving medium thereto,
   flexible means for connecting said device to the ground for limiting movement of said device away from the ground, and
   means for indicating the elevation of said device above the ground, said indicating means including:
   a spool rotatably mounted on said device,
   a spiral spring for rotating said spool,
   a line having one end made fast on the ground and having a second end made fast on said spool for winding said line onto said spool upon rotation thereof by said spring, and
   an indicator connected to said spool for indicating the number of revolutions made by said spool.

References Cited by the Examiner

UNITED STATES PATENTS

| | | | |
|---|---|---|---|
| 2,433,251 | 12/47 | Whiting | 244—17.19 |
| 2,518,697 | 8/60 | Lee | 244—17.19 |
| 2,659,556 | 11/53 | Doblhoff | 244—17.11 X |
| 2,921,743 | 1/60 | Westover | 46—77 X |
| 2,954,614 | 10/60 | Vogt | 35—12 |
| 2,995,740 | 8/61 | Shreckengost | 244—17.17 X |
| 3,093,927 | 6/63 | Smith | 46—77 |

JEROME SCHNALL, *Primary Examiner.*

GEORGE NINAS, JR., *Examiner.*